Figure 1:
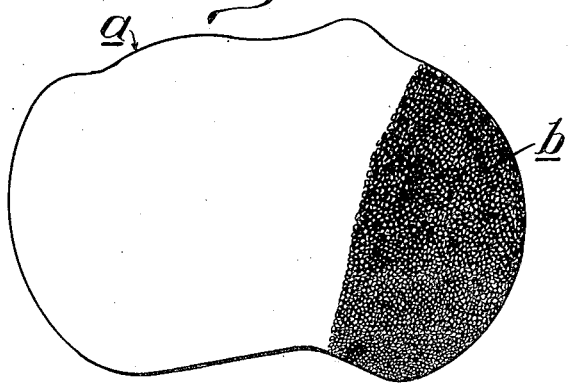

Jan. 13, 1942.  J. L. KELLOGG, JR  2,269,536
PUFFED CEREAL PRODUCT AND PROCESS OF MAKING SAME

Filed Feb. 25, 1937

Inventor
John L. Kellogg Jr.
By Barnett & Tillman
Attorneys

Patented Jan. 13, 1942

2,269,536

UNITED STATES PATENT OFFICE 2,269,536

PUFFED CEREAL PRODUCT AND PROCESS OF MAKING SAME

John L. Kellogg, Jr., Battle Creek, Mich., assignor, by mesne assignments, to Helen L. Kellogg, Chicago, Ill.

Application February 25, 1937, Serial No. 127,672

15 Claims. (Cl. 99—82)

This invention relates to the production of a puffed ready-to-eat cereal food from Indian corn, either in the form of unhulled kernels or hulled kernels such as hominy or so-called corn grits.

Rice, wheat and possibly other cereal grains have been successfully puffed for many years and the products manufactured and sold in large quantities. Corn, however, does not satisfactorily respond to the processes successfully used for puffing rice or wheat; and although many efforts have been made to produce a palatable breakfast food by puffing corn, these efforts, prior to the present invention, have been unsuccessful from the practical point of view. If corn in the form of unhulled kernels or in the form of grits be treated uncooked and in substantially air-dry condition, or by the addition of some moisture in the gun barrel by the explosive or gun method used for puffing rice or wheat, the cells or microscopic voids in the grain are slightly enlarged, giving a considerable enlargement of the kernel or grit, but the voids or cells are still very minute so that the product has a spongy or pithy character, the internal structure of the puffed grain being composed of an enormous number of very minute cells. In this condition the corn is not very crisp nor palatable and is quite hygroscopic so that it soon loses what little crispness the original product possessed. Efforts have been made to pre-cook the corn, deform or flatten it between rolls, but not to the thinness of the corn when used for making corn flakes, and thereafter effect a toasting and partial puffing in an oven. These last mentioned processes, however, have not given merchantable products and have been abandoned, or practically so, so far as treatment of corn is concerned. The cell structure of the products of these experiments was somewhat expanded and enlarged, that is, the voids were considerably larger than the voids produced by the gun method above described, but the corn particles after treatment, whether unhulled kernels or grits, were small in size, hardly more than one-fourth of the size (volume) of the particles produced from grits of the same size by the process of this invention, and the product was, consequently, harsh and unpalatable. The present invention provides a method whereby corn, either in the form of unhulled kernels or in the form of grits, may be puffed to a suitable size with such changes in the internal structure of the particle that the puffed product is crisp, palatable and relatively non-hygroscopic. Apparently, the cell walls of the grain are largely broken down so that (as a result of the explosive puffing by the gun method, preceded by the treatments to be hereinafter described), the corn particle, instead of being made up of an enormous number of slightly expanded cells, consists of a relatively small number of very greatly enlarged cells, quite irregular in their shape and differing somewhat in size, defined by cell walls or webs of considerable thickness and hardness. This structure gives the corn particle its crispness and its relative non-hygroscopicity.

The drawing illustrates the comparisons referred to above.

Figure 2:
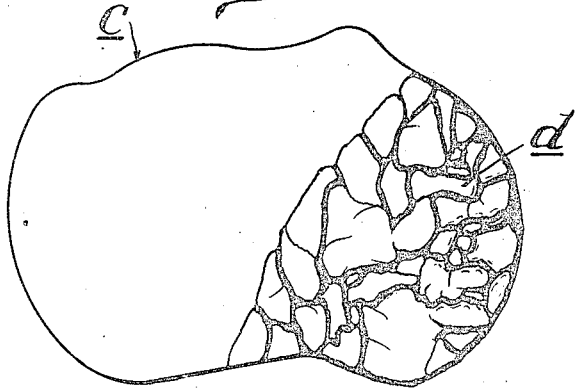

Fig. 1 illustrates a corn grit uncooked and puffed by the usual explosive or gun method. Fig. 2 represents the internal structure of a puffed corn grit produced in accordance with the present invention.

The drawings are all on a magnification scale of about 8.5 diameters. However, in Fig. 1 the size of the voids or cells had to be exaggerated in order that they show at all. Actually the voids are smaller than the drawing indicates.

Referring to the drawing, in Fig. 1 $a$ indicates the outline of the uncooked gun puffed corn grit. $b$ is a sectional portion of the particle. The white dots indicate the voids. In Fig. 2, $c$ indicates the outline of a corn particle produced by the process of this invention, a portion of which, as indicated at $d$ is shown in sections, the voids being indicated by the white spaces and the separating walls of the cells by the irregular black lines.

According to the present invention the corn, preferably in the form of hominy or corn grits that is dehulled and degerminated corn kernels or portions of dehulled and degerminated corn kernels, is first cooked with or without a seasoning substance; it is then dried, if necessary, to remove a surplus moisture so that the particles will not stick together during subsequent treatment; it is then subjected to pressure or impact, which need not, however, be sufficient to permanently deform the particles to any considerable extent and should not be sufficient to reduce the material to the flaked condition such as the thinning to which the grain is reduced in making corn flakes. This is what is meant by the statement in the claims that the internal structure of the grain is altered without reducing it to a flaked condition. Some thinning may take place. The grain is then dried to approximately an air-dry condition; and finally is introduced into a puffing gun and explosively puffed, either with or without the introduction of steam into the gun, by a method which is known and practiced in connection with the puffing of other grains.

The following is a specific example of a preferred method of practicing the process of the invention; it being understood, however, that the process is subject to modification and variation and that it is the intention to cover all equivalents and all modifications within the scope of the appended claims.

Example (a) The first step is to cook the corn either with or without flavoring material. For this operation four gallons of water are mixed with 100 pounds of corn grits, for example, number 4 or 5 grits, that is grits small enough to pass through a screen having four meshes to the linear inch and large enough to be retained on a six-mesh screen. The size of the grits may be varied. It is preferable to have the size relatively uniform. 2-3 pounds of salt may be added. The cooking is preferably accomplished in a rotary pressure cooker at about 15 to 25 pounds steam pressure per square inch. The cooking is continued for a period of from 40 to 80 minutes, preferably 55 minutes, until all the water has been absorbed, the material thoroughly softened and until some modification, apparently, has been brought about in the internal cellular structure of the grain involving no doubt some dextrinization of the starch. If the cooking period is too short, the product will be tough and gummy and will not properly respond to the subsequent treatments which it must receive. If the cooking is carried on for too long a period, the product will be discolored and excessively brittle.

(b) After cooking the grain is ordinarily dried down to a moisture content at which the kernels will not adhere to one another, preferably to a moisture content of 30 to 40%. This drying step will not be necessary if the cooked grain is not wet enough to be sticky.

(c) The cooked grains are then subjected to pressure, impact, or other mechanically applied force of such character as to, apparently, bring about changes in the internal structure of the grain. Apparently this operation breaks down the cell walls probably weakened by the cooking step. The result may be accomplished by dropping the cooked material upon a hard, flat surface from a height of 60 to 80 feet; or by shooting or hurling the grain against a hard surface at a corresponding velocity; or the grits may be passed between flaking rolls preferably, however, set apart wider than in the case of ordinary flaking operations. If the latter method is followed, the rolls may be set apart from 0.06 to 0.095 of an inch for the number 4 or 5 grits referred to above. It is not necessary, ordinarily, to permanently deform the grits or kernels. Impact or pressure bringing about modifications of internal texture is the desideratum and not the deformation or, apparently, change in superficial texture.

(d) The material is then dried by any suitable means to a moisture content of from 9% to 15%, preferably 12%, and is preferably, although not necessarily, tempered for a period of 12 to 30 hours, preferably 24 hours, to insure relatively uniform distribution of moisture content through the material.

(e) The material is then introduced into an air-tight puffing apparatus or "gun" which consists of a rotatable cylinder permanently closed at one end and having an air-tight cover over the other end, together with means for heating the cylinder to create an internal steam pressure by vaporization of the moisture in the corn. Water or steam may be introduced into the gun if desired. The gun after being filled to about ⅓ capacity is rotated and heated until there is developed an internal pressure of from 150 to 225 pounds per square inch, the preferred pressure being 200 pounds per square inch. The heat is applied gradually so that the desired pressure is reached in from 5 to 15 minutes; the best results being obtained, according to my experience, if the temperature is controlled so that a pressure of 200 pounds is reached in approximately 7 minutes and this pressure then held for 2 minutes thereafter. The cover of the gun is then suddenly removed and as a result of the sudden reduction of external pressure the grain undergoes an explosive expansion or puffing which is variable in accordance with the moisture content of the grain, the heat and the pressure. The grits can be readily expanded to from 15 to 20 times their original size (volume). The moisture content of the puffed material as it comes from the gun will be ordinarily between 5 and 8%, usually about 6%.

If the flavoring material has not been added in the first stage or in the gun, the material may be flavored with salt, sugar or other flavoring material after it has been puffed.

The puffed material is preferably dried to a moisture content of 3% to 4% in order to increase its crispness and keeping qualities.

The term "explosively puffing" as used herein is intended to mean the sort of instantaneous puffing accomplished, for example, by the gun method as above described, or other method giving an explosive action due to external pressure reduction in contra-distinction to the comparatively slow blistering action or gradual and relatively small expansion that might be called puffing which takes place when the grain particles are subjected to heat in an oven.

The term "corn" as used herein refers either to the whole corn or to hominy or corn grits.

The term "mechanical pressure" used to describe the step following the cooking and drying is intended to cover impact, jarring or other similar application of mechanical force as well as the pressure exerted by "flaking" or "bumping" rolls.

I claim:

1. Process of producing a puffed and ready-to-eat cereal product from corn which comprises: cooking the corn with water; drying the cooked material to a moisture content of substantially 30-40%; subjecting the grains to mechanical pressure to alter the internal structure of the grain without reducing it to a flaked condition; drying the material to a moisture content of about 9% to 15%; and explosively puffing it.

2. Process of producing a puffed and ready-to-eat cereal product from corn which comprises: cooking corn grits of approximately the number 4 or 5 size with water; passing the cooked corn particles between rolls set at from 0.060 to 0.095 of an inch apart to alter the internal structure of the grits without reducing them to a flaked condition; drying the material to a water content of 9%-15%; and thereafter explosively puffing the material.

3. Process of producing a puffed and ready-to-eat cereal product from corn which comprises: mixing 100 pounds of corn grits with four gallons of water; cooking the mixture under 15-25 pounds steam pressure for a period of 40-80 minutes; drying the cooked grits to a moisture content of about 30-40%; compressing the grits between rolls set about 0.06 to 0.095 of an inch apart to alter the internal structure of the grain without reducing it to a flaked condition; drying the grits to a moisture content of about 9-15%; tempering the material for 12-30 hours to obtain substantially uniform moisture content; and puffing the tempered grits in a gun by heating the material therein for 5-15 minutes to develop a pressure of 200 pounds per square inch.

4. A ready-to-eat cooked corn product consisting of hulled and degerminated corn grits enlarged to approximately the extent of 15 to 20 times the size of the original grits, in which the internal cell structure of the corn is broken down to a large extent so that it has a relatively small number of very large voids and much thicker cell walls in comparison with the internal structure of the original corn, whereby the product is light, crisp and relatively non-hygroscopic.

5. A ready-to-eat cooked corn product consisting of corn particles enlarged to approximately the extent of 15 to 20 times the size of the untreated particles, in which the internal cell structure of the corn is broken down to a large extent so that it has a relatively small number of very large voids and much thicker walls in comparison with the internal structure of the original corn whereby the product is light, crisp and relatively non-hygroscopic.

6. Process of producing a puffed corn product which comprises: cooking the corn in water, subjecting the same to mechanical pressure to alter the internal structure of the grain without reducing it to a flaked condition; drying the material to a water content suitable for explosive puffing; and thereafter explosively puffing the material.

7. Process of producing a puffed corn product which comprises: cooking the corn in water, partially drying the material, subjecting the same to mechanical pressure to alter the internal structure of the grain without reducing it to a flaked condition; drying the material to a water content suitable for explosive puffing; and thereafter explosively puffing the material.

8. Process of producing a puffed corn product which comprises: cooking the corn in water, subjecting the same to mechanical pressure to alter the internal structure of the grain without reducing it to a flaked condition; drying the material to a water content of 9% to 15%; and thereafter explosively puffing the material.

9. Process of producing a puffed corn product which comprises: cooking the corn in water; partially drying the material; subjecting the same to mechanical pressure to alter the internal structure of the grain without reducing it to a flaked condition; giving the material further drying to a water content of 9%-15%; and thereafter explosively puffing the material.

10. Process of treating corn grits for the production of a puffed product which comprises: cooking the grits in water; subjecting the cooked grits to mechanical pressure to alter their internal structure without reducing the material to a flaked condition; drying the grits to a moisture content suitable for explosive puffing; and explosively puffing the material.

11. Process of treating corn grits for the production of a puffed product which comprises: cooking the grits in water; passing the grits in a moist state between rolls which exert a pressure to alter their internal structure without reducing them to a flaked condition; drying the grits to a moisture content suitable for explosive puffing; and explosively puffing the grits.

12. Process of treating corn grits for the production of a puffed product which comprises: cooking the grits in water; partially drying the cooked grits; subjecting the material to mechanical pressure to alter their internal structure without reducing the material to a flaked condition; drying the grits to a moisture content suitable for explosive puffing; and explosively puffing the material.

13. Process of treating corn grits for the production of a puffed product which comprises: cooking the grits in water; partially drying the cooked grits; subjecting the material to mechanical pressure to alter their internal structure without reducing the material to a flaked condition; giving the material a further drying operation to bring it to a water content of 9%-15%; and explosively puffing the material.

14. Process of treating corn grits for the production of a puffed product which comprises: cooking the grits in water; subjecting the material to mechanical pressure to alter the internal structure of the grits without reducing them to a flaked condition; drying the material to give it a water content suitable for explosive puffing and explosively puffing the material after eliminating some of the water absorbed by the material during the cooking step.

15. Process of producing a puffed corn product which comprises: cooking the corn in water, partially drying the material, subjecting the same to mechanical pressure to alter the internal structure of the grain without reducing it to a flaked condition, drying the material to a water content of about 12%; and thereafter explosively puffing the material.

JOHN L. KELLOGG, Jr.